(12) United States Patent
Ishikawa

(10) Patent No.: US 7,293,468 B2
(45) Date of Patent: Nov. 13, 2007

(54) ELECTROMAGNETIC FLOWMETER

(75) Inventor: Ikuhiko Ishikawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 23 days.

(21) Appl. No.: 11/100,139

(22) Filed: Apr. 5, 2005

(65) Prior Publication Data

US 2005/0223816 A1 Oct. 13, 2005

(30) Foreign Application Priority Data

Apr. 8, 2004 (JP) ............... 2004-113996

(51) Int. Cl.
*G01F 1/58* (2006.01)
(52) U.S. Cl. .................. 73/861.12
(58) Field of Classification Search ............ 73/861.16, 73/761.12, 861.08, 861.11, 861.13, 861.14, 73/861.12; 364/510
See application file for complete search history.

(56) References Cited

U.S. PATENT DOCUMENTS

| 2,741,121 A | 4/1956 | Raynsford |
| 4,409,846 A | 10/1983 | Ueno |
| 4,736,635 A | 4/1988 | Murase |
| 5,125,276 A * | 6/1992 | Wada ............ 73/861.12 |
| 5,544,532 A * | 8/1996 | Brown ............ 73/861.16 |

FOREIGN PATENT DOCUMENTS

| GB | 978900 | 12/1964 |
| JP | 55-106316 | 8/1980 |
| JP | 8-75514 | 3/1996 |
| JP | 3043087 | 3/2000 |
| JP | 2001-281028 | 10/2001 |

OTHER PUBLICATIONS

European Search Report dated Aug. 23, 2005.
Chinese Office Action (dated Dec. 1, 2006).

* cited by examiner

*Primary Examiner*—Jewel Thompson
(74) *Attorney, Agent, or Firm*—John J. Penny, Jr.; Edwards Angell Palmer & Dodge LLP

(57) ABSTRACT

In order to attain a desired magnetic flux density, a parallel configuration of N divided magnetic circuits is formed, and accommodated on one pair of plate cores as N groups of exciting coils. According to the configuration, the burden of the magnetic coercive force which is driven by one of the magnetic circuits is reduced to 1/N. As a result, the consumption of the excitation power in each of the magnetic circuits can be reduced to $(1/N)^2$. The total of magnetic fluxes which are obtained as a result of parallel driving of the N magnetic circuits are collected onto the single plate core.

19 Claims, 6 Drawing Sheets

ELECTROMAGNETIC FLOWMETER

CROSS-REFERENCE TO RELATED APPLICATIONS

This application is based upon and claims the benefit of priority from the prior Japanese Patent Applications No. 2004-113996, filed on Apr. 8, 2004, the entire contents of which are incorporated herein by reference.

BACKGROUND OF THE INVENTION

1. Field of the Invention

The present invention relates to an electromagnetic flowmeter in which the measurement principle is based on an induced electromotive force due to excitation magnetic fluxes that intersect with fluid to be measured flowing through a pipe, and more particularly to an electromagnetic flowmeter which is improved so as to attain a high magnetic flux density at low power consumption.

2. Description of the Related Art

The following document relates to a measurement principle of an electromagnetic flowmeter having exciting coils of the residual magnetic field type.

JP-A-55-106316 is referred to as a related art.

The following documents relate to a measurement principle of an electromagnetic flowmeter having plural pairs of exciting coils.

JP-A-2001-281028 and JP-A-8-75514 are referred to a related art.

JP-A-2001-281028 discloses an electromagnetic flowmeter which has plural pairs of exciting coils, and which is suited to a large-diameter pipe. However, the electromagnetic flowmeter of JP-A-2001-281028 fails to have a feature of the residual magnetic field type that the operating point is on the permeance line in the second or fourth quadrant of the B-H hysteresis characteristic.

In the electromagnetic flowmeter of JP-A-8-75514 having plural pairs of exciting coils, magnetic circuits are configured by a group of exciting coils applied to plural pole piece cores, and a single return core serving as a feedback magnetic path. However, the configuration does not include plate cores which add together magnetic fluxes of the exciting coils, and evenly distribute the added fluxes to the interior of a pipe to be measured.

Next, an electromagnetic flowmeter corresponding to JP-A-55-106316 will be described with reference to FIGS. 5A and 5B. FIGS. 5A and 5B show in a simplified manner the configuration of an electromagnetic flowmeter having exciting coils of the residual magnetic field type. The electromagnetic flowmeter shown by FIGS. 5A and 5B is configured by magnetic pole cores 1, exciting coils 2, a feedback magnetic path 4, a pipe to be measured 5, and electrodes 6.

The pair of exciting coils 2 which are opposed to each other across the central axis of the flow path of the pipe to be measured 5 are configured so as to form a common magnetic circuit. The exciting coils 2 are connected to a current source which is not shown, and can be simultaneously supplied with exciting currents of the same level, respectively. By contrast, the two electrodes 6 are opposed to each other across the central axis of the flow path of the pipe to be measured 5, and perpendicular to an axis connecting the exciting coils 2 with each other.

The operation of the electromagnetic flowmeter of the residual magnetic field type which is exemplarily shown in FIGS. 5A and 5B will be described. The pair of exciting coils 2 have a function of exciting the magnetic circuit which is not shown. The exciting current in which the direction is intermittently alternately inverted at a constant period is applied to the coils.

In the magnetic pole cores 1, a semi-hard magnetic material having a magnetic property which is between the property of a hard magnetic material (a magnet) and that of a soft magnetic material (iron, silicon iron, or the like) is used.

The winding directions of the exciting coils 2 are set so that, when the exciting current in a certain direction is applied, the exciting coils 2 produce external magnetic fields directed so as to enhance each other. In accordance with the application of the exciting current, therefore, magnetization in both the magnetic pole cores 1 which are positioned at the centers of the respective magnetic fields is advanced, and the magnetic flux densities are saturated.

Even when the exciting current is once extinguished and the external magnetic fields due to the exciting coils 2 disappear, the magnetic pole cores 1 hold a residual magnetic flux density Br. In the electromagnetic flowmeter of the residual magnetic field type, the magnetic circuit in which the residual magnetic flux density provided by the semi-hard magnetic material is used as a magnetomotive force is used in the measurement.

Namely, the magnetic circuit is maintained by the magnetic energy remaining in the two magnetic pole cores 1, and set so that a part of the magnetic path crosses the central axis of the flow path of the pipe to be measured 5. Therefore, the magnetic fluxes intersect with a section of the pipe to be measured 5 so as to be symmetrical about the axis and have a substantially uniform shape.

The magnetic fluxes which have crossed the pipe to be measured 5 are collected in the exciting coil 2 in the opposite pole, and are then fed back through the feedback magnetic path 4 to the exciting coil 2 of the pole on the emerging side, thereby completing the magnetic circuit.

When the exciting current then flows in a direction opposite to that along which the exciting current flows in the previous application, the exciting coils 2 produce magnetic fields in directions along which the magnetic fields enhance each other, and which is opposite to the previous direction. In the magnetic pole cores 1 which are positioned respectively at the centers of the magnetic fields, both the magnetization and the magnetic flux density which are previously acquired disappear after a reduction process, magnetization is then advanced in the opposite direction, and the magnetic flux densities in the opposite direction are saturated. As a result, also the direction of the magnetic circuit passing through the feedback magnetic path 4 and the pipe to be measured 5 is inverted.

The history of the magnetization process of the magnetic pole cores 1 which is repeated at a constant period is known as a magnetic hysteresis curve (B-H curve) or the B-H hysteresis characteristic in which the direction and strength of the applied external magnetic field H are set as the abscissa, and those of the magnetic flux density in the magnetization are set as the ordinate.

In the magnetic pole cores 1, in accordance with the hysteresis characteristic of the semi-hard magnetic material, the magnetization state is alternately inverted through the one cycle process. Also in the magnetic circuit, therefore, the direction of the magnetic path is inverted at a constant period in accordance with the external magnetic field produced at the timing of the exciting current in which the application direction is intermittently alternately inverted at the constant period.

The residual magnetic fluxes of the magnetic pole cores 1 provided by the exciting coils 2 are used as the magnetomotive force which, when the exciting current is not applied, or during the most time period when the inversion of the magnetic path is not conducted, causes the magnetic circuit to maintain the stable magnetic path.

When fluid F in the pipe to be measured 5 crosses the magnetic fluxes of the magnetic circuit in a stabilized state, an induced electromotive force I which has a direction perpendicular to both the magnetic flux density B and the fluid movement F, and a magnitude that is the product of B and F is produced according to Faraday's law of electromagnetic induction.

Because the magnetic pole cores 1 perform the function of holding the residual magnetic flux density, the magnetic flux B at this timing is held to a constant value. Therefore, a voltage which is observed between the electrodes 6 as the induced electromotive force I correctly reflects the degree of the fluid movement F. Namely, the observation of the waveform of the voltage between the electrodes 6 results in real-time observation of the movement distance of the fluid F which is in proportional relationship.

Because of the principle that a physical quantity which is obtained as the product of F·B as described above is used in the measurement, the measurement accuracy and flow velocity resolution of an electromagnetic flowmeter of the residual magnetic field type are directly affected by the residual magnetic flux density B given by an intersecting magnetic circuit.

In the magnetic circuit, the magnetic path is configured as a form which takes a round through the magnetic pole cores 1, the feedback magnetic path 4, air gaps (not shown) in the surfaces of the exciting coils 2, and the like. The magnetic flux density B of a constant value corresponding to the magnetization energy remaining in the semi-hard magnetic material of the magnetic pole cores 1 is determined depending on the permeance Pm of the whole system which is uniquely defined by the qualities, shapes, permeabilities, and the like of materials in the path.

FIG. 6 shows the second quadrant of the B-H hysteresis characteristic of the semi-hard magnetic material used in the magnetic pole cores of the electromagnetic flowmeter of FIGS. 5A and 5B. The permeance Pm which is uniquely defined by the shape and material quality of the magnetic path is constant in the system, and, in FIG. 6, therefore, indicated by a permeance line Pm having a constant slope.

A state where a residual magnetization energy required for measuring a flow rate is held means a state where a diamagnetic field component which has a constant ratio with respect to the magnetization energy is balanced and stabilized, and is indicated in the second or fourth quadrant of the B-H hysteresis characteristic. In an electromagnetic flowmeter of the residual magnetic field type, namely, a stabilized state of a system is always attained on the permeance line.

In an electromagnetic flowmeter, as is apparent from the measurement principle, when the magnetic flux density B intersecting with the flow path F can be increased, the accuracy and the flow velocity resolution can be proportionally improved because the measurement result is the product of the constant magnetic flux density B and the flow rate F.

In an electromagnetic flowmeter of the residual magnetic field type, the residual magnetic flux density in a stable state based on the residual magnetic energy is used in measurement, and hence an electric power is consumed only when an external magnetic field required for inverting the magnetic flux direction is applied.

Therefore, the electromagnetic flowmeter of this type consumes less power than an electromagnetic flowmeter of another type, and therefore can be driven by batteries. Consequently, an electromagnetic flowmeter of the residual magnetic field type has an advantage that the installation place is not restricted by the electric power condition and assurance of power supply, and hence is widely used in indoor and outdoor fluid transporting facilities.

In a magnetic circuit of an electromagnetic flowmeter, usually, magnetic fluxes hardly penetrate into an air gap, and hence the function of increasing a diamagnetic field component which is opposite to the direction of a magnetic path with respect to the whole magnetization energy is enhanced. Such a configuration factor causes a function of reducing the permeance Pm obtained in the system. Therefore, it is difficult to largely increase the magnetic flux density Bm.

In an electromagnetic flowmeter of the residual magnetic field type, the permeance Pm is constant. In order to obtain a magnetic flux density which is higher than the current density Bm1 without changing the configuration and structure of a magnetic path, therefore, the material of magnetic pole cores must be changed so as to increase the magnetic coercive force Hc as shown in the characteristic diagram of FIG. 6.

When the magnetic coercive force is increased from Hc to a doubled value or 2·Hc, for example, it is possible to ensure a new operation value Bm2 which is proportionally positioned on the permeance line of FIG. 6 and determined by a residual magnetic flux density Br. Therefore, the operation point of the system is moved from P1 to P2.

In a similar manner as Joule's heat which is generated by the square of a current in an electric circuit, a hysteresis loss is generated in a magnetic circuit in proportion to the square of the magnetic coercive force 2·Hc for excitation. As a result, the required excitation power is four times that required in the case of Hc.

As described above, in an electromagnetic flowmeter of the residual magnetic field type which is characterized in low power consumption, ensuring of the magnetic flux density Bm which is necessary and sufficient for attaining high sensitivity and accuracy with respect to fluid to be measured F is a tradeoff with the power consumption. In the above electromagnetic flowmeter of the residual magnetic field type shown in FIGS. 5A and 5B, namely, it is difficult to solve both the contradictory problems that the power consumption is reduced, and that magnetic fluxes are efficiently increased.

SUMMARY OF THE INVENTION

The object of the invention is to provide an electromagnetic flowmeter which enhances the magnetic flux density with a minimum input of excitation energy while suppressing the power consumption.

The invention provide an electromagnetic flowmeter having: a plurality of magnetic pole cores which produce magnetic fluxes intersecting with a fluid to be measured flowing through a pipe; an exciting coil which applies an external magnetic field to each of the magnetic pole cores; and a pair of plate cores which are in contact with the pipe.

In the electromagnetic flowmeter, each of the magnetic pole cores bear a magnetic coercive force corresponding to each of the magnetic fluxes.

In the electromagnetic flowmeter, each of the magnetic pole cores evenly bear a magnetic coercive force corresponding to each of the magnetic fluxes.

In the electromagnetic flowmeter, the plurality of magnetic pole cores are disposed on the plate cores so that all magnetic fields are aligned in a same direction.

In the electromagnetic flowmeter, the plate cores are disposed between the magnetic pole cores and the pipe.

In the electromagnetic flowmeter, the magnetic fluxes produced by the plurality of magnetic pole cores are gathered to the plate cores, the plate cores shape magnetic fluxes which evenly intersect in an interior of the pipe.

In the electromagnetic flowmeter, each of the plurality of magnetic pole cores forms an independent magnetic circuit.

In the electromagnetic flowmeter, the magnetic circuit corresponding to each magnetic pole cores has a same magnetomotive force and a same permeance, and shapes of magnetic paths are congruent with one another.

In the electromagnetic flowmeter, the magnetic fluxes are produced by a residual magnetic field in which a direction is alternately inverted at a constant period.

According to the electromagnetic flowmeter, it is possible to obtain a desired magnetic flux density with minimum power consumption.

In the configuration having a single magnetic circuit in which the magnetic coercive force of a magnetic pole core is increased, and which has only one set of exciting coils, the required excitation energy is sharply increased by the square of the increasing rate of magnetic fluxes. In the parallel configuration having magnetic circuits, by contrast, the required excitation energy can be suppressed so as to be in direct proportion to the increasing rate of magnetic fluxes, without changing the magnetic coercive force of a magnetic pole core.

When a single magnetic circuit is divided so as to form a parallel configuration having an N number of circuits in each of which the magnetic coercive force of a magnetic core is set to 1/N, a magnetic flux density of a certain value can be obtained by an excitation energy per magnetic circuit which is reduced to $(1/N)^2$.

When a desired magnetic flux density is to be obtained in the electromagnetic flowmeter, therefore, it is possible to select a configuration where an exciting coil that is to be placed on each plate core is divided into several coils. As a result, an effect that the excitation power is exponentially reduced can be achieved.

DETAILED DESCRIPTION OF THE PREFERRED EMBODIMENTS

Figure 1A:
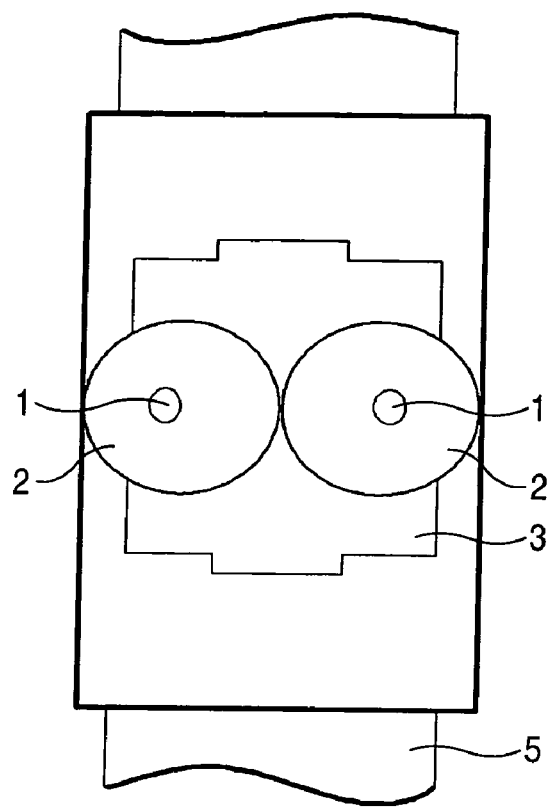
FIGS. 1A and 1B are diagrams showing two views of the configuration of an embodiment of the electromagnetic flowmeter to which the invention is applied.
Figure 1B:
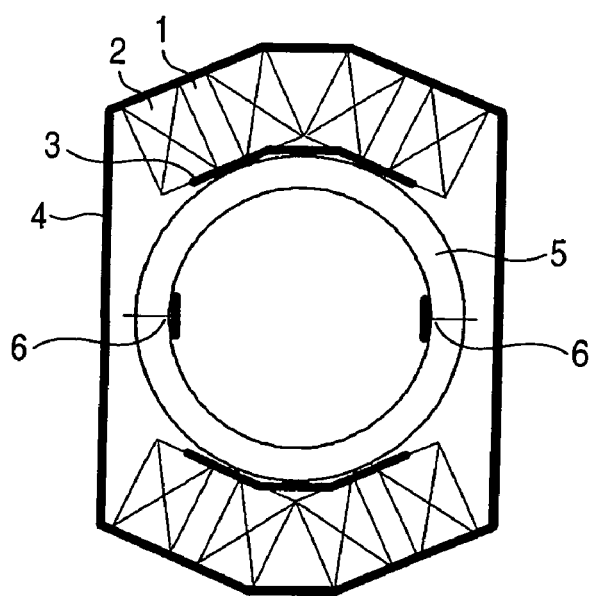

The invention will be described in detail with reference to the accompanying drawings. FIGS. 1A and 1B are diagrams showing the configuration of an embodiment of the electromagnetic flowmeter of the residual magnetic field type according to the invention.

Figure 5A:
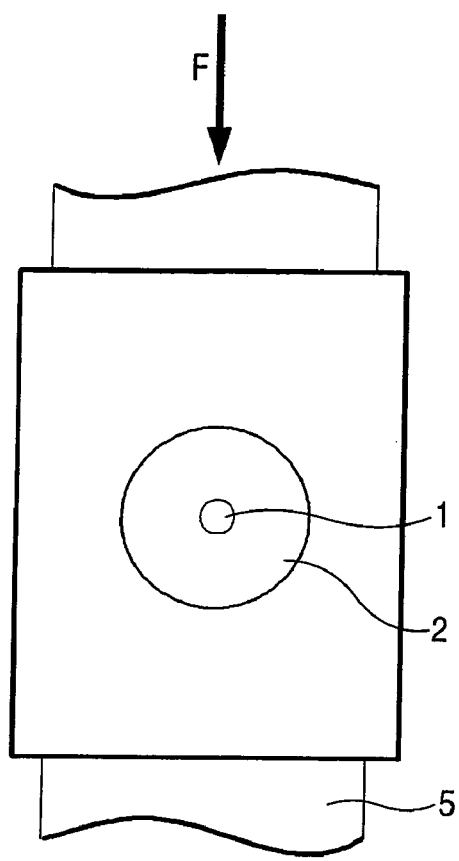
FIGS. 5A and 5B are diagrams showing an example of the configuration of a conventional electromagnetic flowmeter of the residual magnetic field type.
Figure 5B:
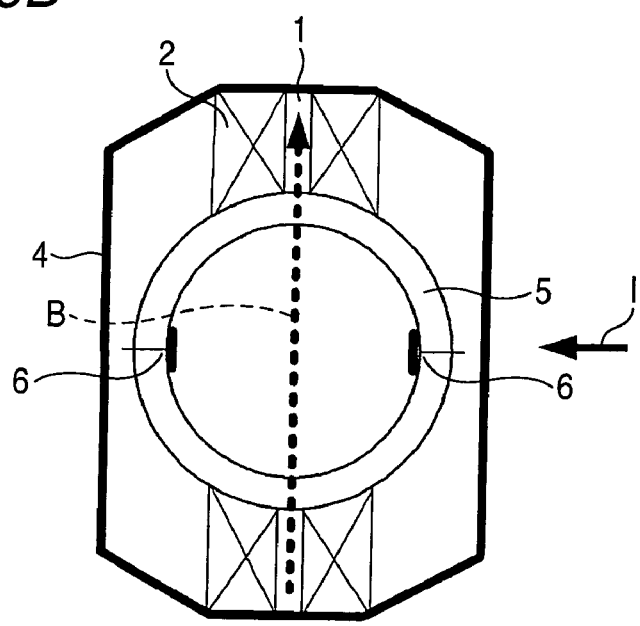
Figure 6:
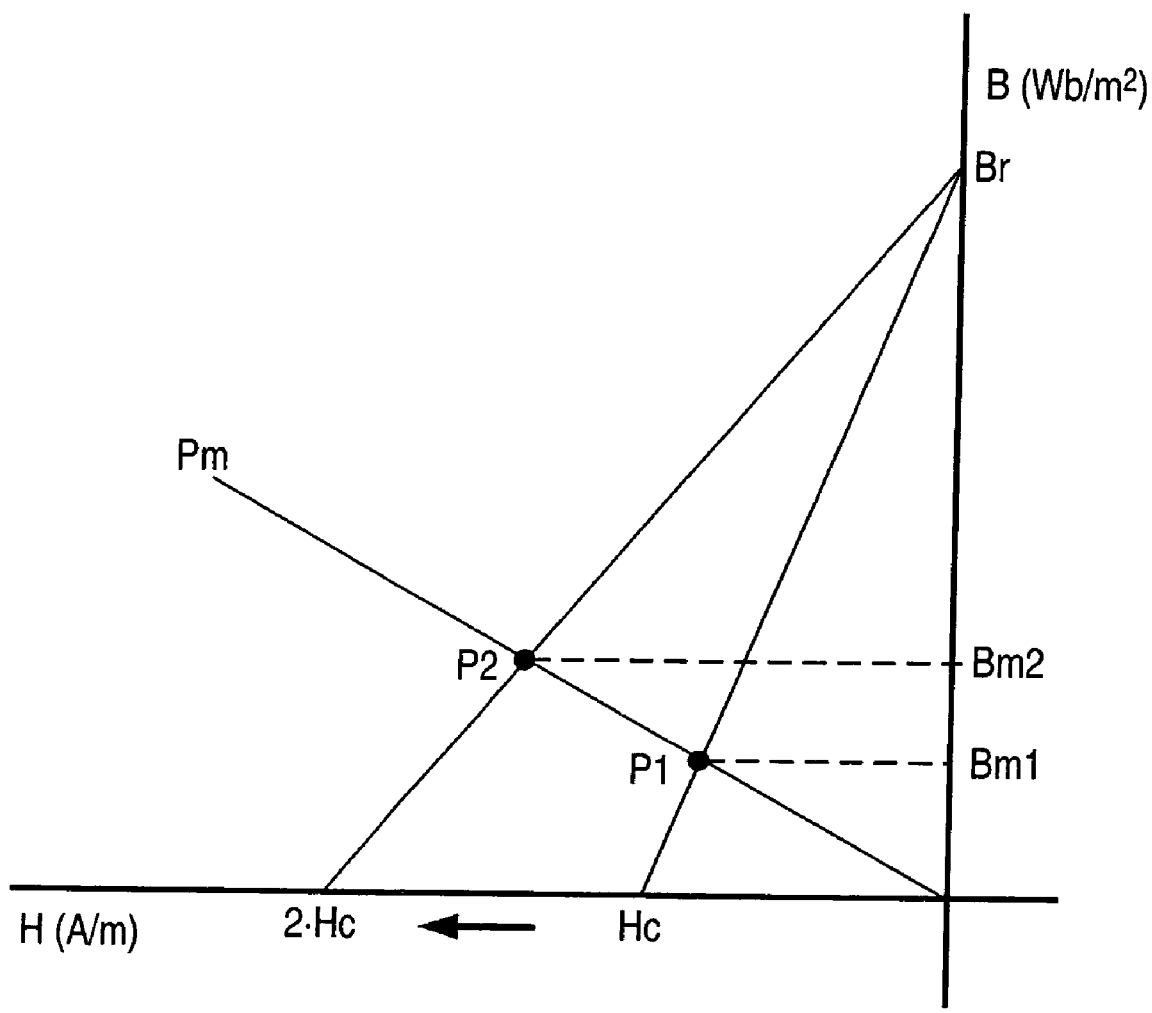
FIG. 6 is a diagram showing excitation powers in the B-H hysteresis characteristic of a semi-hard magnetic material, by means of area ratios.

The embodiment shown by FIGS. 1A and 1B is configured by magnetic pole cores 1, exciting coils 2, plate cores 3, a feedback magnetic path 4, a pipe to be measured 5, and electrodes 6. The components which are denoted by the same reference numerals as those in the related art example shown in FIGS. 5A and 5B have the same function as those of the example, and hence their detailed description is omitted.

The invention is characterized in that a magnetic circuit which must be driven to generate residual magnetic fluxes is divided to form a parallel configuration and the plate cores 3 have a function of causing plural magnetic cores to bear provision of a predetermined magnetic coercive force Hc.

As the magnetic pole cores 1, a semi-hard magnetic material having a magnetic coercive force of 400 A/m to 8 kA/m is used. Two pairs or four magnetic pole cores 1 are used, and arranged on the same section of the pipe to be measured 5 along the circumferential direction of the pipe to be measured 5.

The exciting coils 2 of the same number of turns are applied to the magnetic pole cores 1, respectively. The exciting coils of magnetic cores which are opposed to each other to constitute a pair are wound in a direction so as to share the same magnetic field.

In order to enable the opposed exciting coils 2 to be angularly separated at the maximum degree on the circumference of the pipe to be measured 5, the exciting coils are disposed on the upper face side and the lower face side, and the exciting coils on each side are closely placed. The upper- and lower-face exciting coil groups alternately bear the S-pole or the N-pole. Each of the plate cores 3 is disposed between the pipe to be measured 5 and the corresponding exciting coils 2 so as to be in close contact with the exciting coil group, and has a shape extending along the section of the pipe to be measured 5, and a specific thickness.

The feedback magnetic path 4 is sealingly disposed around the outer periphery of the pipe to be measured 5, and has a minimum inner diameter which allows the exciting coils 2 and the plate cores 3 to be housed.

The pipe to be measured 5 is a pipe through which the fluid to be measured F is transported. The inner wall of the pipe is lined with an insulative material.

In the embodiment of FIGS. 1A end 1B, the electrodes 6 are disposed so as to be in contact with the fluid to be measured F. The electrodes 6 are oppositely disposed in two places at an angle of approximately 90 deg. with respect to axis connecting the centers of die groups of the exciting coils 2 of the poles which are disposed closely on the respective upper and lower face sides, or at positions perpendicularly intersecting with the direction of the magnetic field produced by the groups of the exciting coils 2 which are correspondingly disposed.

Next, the function of the embodiment of FIGS. 1A and 1B will be described. A pulse current having a square waveform or a triangular saw-tooth waveform is applied to the exciting coils 2. After an elapse of a fixed time period, a pulse current which is opposite in direction, and which has a congruent waveform is applied to the coils. When such repetitive currents which are respectively positive and negative about the ground level are applied at constant intervals, the groups of the exciting coils 2 produce a magnetic field in which the direction is repeatedly inverted at the constant intervals.

The magnetic field which is produced when the current flows in the positive direction, and in which the periphery of the exciting coils 2 is set as an axis expedites magnetization of the magnetic pole cores 1. Even after the current is stopped, the magnetic flux density Bm which is obtained by subtracting the component that is cancelled out by a diamagnetic field continues to stably exist.

When a current then flows in the opposite direction, a magnetic field which is produced when the current flows, and in which the periphery of the exciting coils 2 is set as an axis and the direction is opposite to the previous one expedites magnetization of the magnetic pole cores 1 in the opposite direction. Even after the current is stopped, the residual magnetic flux density -Bm of the opposite direction which is obtained by subtracting the component that is cancelled out by a diamagnetic field continues to stably exist.

When such operations are continuously repeated, the magnetic flux density |Bm| is stably maintained during the whole time period except time periods of inversion of magnetic poles due to the current application. Since current waveforms which are axisymmetrical about the ground level are repeatedly applied, the embodiment exerts functions of suppressing zero drift of a current driving circuit which is not shown, and maintaining the densities of magnetic fluxes which are generated in both the positive and negative directions, to a constant level.

In the process of applying an exciting current in order to magnetize the magnetic pole cores 1, the current application is conduct at the same timing on the plural pairs of exciting coils 2 in both the positive and negative directions. Therefore, the exciting coils 2 can be connected in series or in parallel to the current driving circuit.

The residual magnetic energy for maintaining the magnetic flux density |Bm| is stored in the magnetic pole cores 1 of the both poles. The magnetic fluxes Bm emerging from the magnetic pole cores penetrate via the plate cores 3 into the interior of the pipe to be measured 5. Since the directions of Bm are alternately inverted, the vector of Bm indicating the presence of the magnetic fluxes is not shown in the figure.

The plate cores 3 have functions of enhancing the permeances of the magnetic paths, expediting the penetration of magnetic fluxes into the pipe to be measured 5, and improving the magnetic field distribution in the pipe so as to have a symmetrical shape, whereby influence on the flow distribution of the fluid to be measured is minimized.

The exciting coils 2 on the plate core 3 of each pole are in close contact with each other in order to minimize leakage of magnetic fluxes from the magnetic circuits. Since a plurality of exciting coils 2, or two coils in the embodiment of FIGS. 1A and 1B are disposed on the plate core 3 of each pole, each of the plate cores 3 has functions of accepting the magnetic flux density of 2×Bm, and cooperating with the plate core on the opposite pole to symmetrically distribute the fluxes in the pipe to be measured 5, thereby adjusting the arrangement of lines of magnetic force.

The number the exciting coils 2 which are placed on each plate core 3 may be increased. When N pairs of exciting coils 2 are used, for example, the total magnetic flux density is N×Bm, and therefore the total magnetic fluxes which penetrate into the pipe 5 to contribute to the measurement are enhanced to N times.

When the fluid F crosses the magnetic fluxes B penetrating into the pipe to be measured 5, an induced electromotive force which has a direction perpendicular to both the magnetic flux density B and the fluid movement F, and a magnitude that is given by the product of B and F is produced according to Faraday's law of electromagnetic induction.

The induced electromotive force is produced by magnetic fluxes of 2×Bm caused by the two exciting coils 2. Therefore, the embodiment has an effect that the measurement sensitivity and accuracy with respect to the flow rate F can be improved or doubled as compared with the configuration of a single exciting coil.

As described above, when the number of sets of exciting coils is increased or, for example, N pairs of exciting coils 2 are used, the total magnetic flux density in the pipe to be measured 5 can be easily enhanced to N×B.

The magnetic flux density of N×B maintains the residual magnetic fluxes to a constant value. Therefore, the voltage waveform which is observed as an induced electromotive force between the electrodes 6 reflects the movement distance of the fluid F. The voltage signal appearing between the electrodes 6 is passed through a buffer, an amplifier, an A/D converter, and the like which are not shown, and then taken out as an output signal which is converted to a digital value, and which indicates the flow rate.

The magnetic fluxes which have passed through the pipe to be measured 5 and crossed the fluid F are collected via the opposed plate core 3 in the respective exciting coils 2 in the opposite pole. By contrast, the feedback magnetic path 4 has a function of magnetically coupling the plate cores 3 of the both poles together outside the pipe to be measured 5, and accommodates magnetic circuits respectively corresponding to the pairs of exciting coils 2. Since FIGS. 1A and 1B shows the sectional structure, the magnetic circuits inside the feedback magnetic path 4 are not shown in the figure in the same manner as the vector of the magnetic flux Bm.

The plate cores 3 and the exciting coils 2 of the both poles are placed so as to be axisymmetric about the central axis. Therefore, the shapes of the magnetic circuits each produced by two exciting coils are axisymmetric and congruent. As a result, even when the number of exciting coils is increased, the magnetic flux distribution in the pipe to be measured 5 can be maintained uniform.

The feedback magnetic path 4 has also a function of shifting the magnetic circuits toward a system of a higher permeance to lower the whole magnetic resistance. Therefore, the magnetic fluxes entering the pipe to be measured 5 can be prevented from being reduced, and the feedback magnetic path can cooperate with the plate cores 3 of the both poles to stabilize the magnetic paths.

FIGS. 2A, 2B, 3A and 3B show examples to which the invention is applied, other than the example of FIGS. 1A and 1B. These figures show section and upper faces of the pipe to be measured, in the same manner as FIGS. 1A and 1B.

Figure 2A:
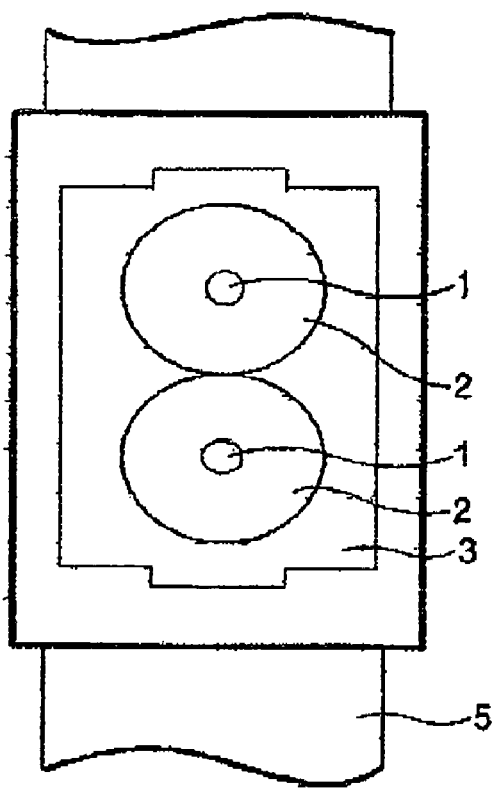
FIGS. 2A and 2B are diagrams showing two views of the configuration of an embodiment of the electromagnetic flowmeter to which the invention is applied.
Figure 2B:
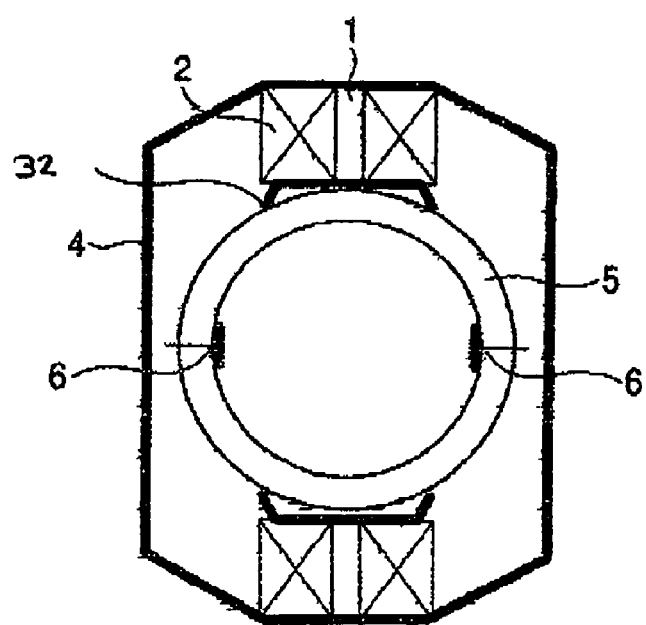

The components which are denoted by the same reference numerals as those of FIGS. 1A and 1B have the same functions, and therefore their description is omitted. In the embodiment of FIGS. 2A and 2B, two pairs or four magnetic pole cores 1 are used in the same manner as that of FIGS. 1A and 1B, and the cores are arranged in the direction of the flow path in place of the circumferential direction of the pipe to be measured 5.

The functions due to the parallel arrangement of two single magnetic circuits are identical with those in the embodiment of FIGS. 1A and 1B. In the embodiment of FIGS. 2A and 2B, the route of the feedback magnetic path 4 is longer than that in the magnetic circuit of FIGS. 1A and 1B, and the magnetic circuits are partly different in shape from the magnetic circuits of FIGS. 1A and 1B. However, the functions of the embodiment of FIGS. 2A and 2B are identical with those of the embodiment of FIGS. 1A and 1B.

Although the shapes of plate cores 32 are different from those in FIGS. 1A and 1B, the plate cores perform the same functions of collecting the plural exciting coils, i.e., the plural magnetic circuits on the single plate core to gather magnetic fluxes, and shaping the fluxes so as to evenly intersect with the pipe to be measured 5 in a symmetrical shape.

Figure 3A:
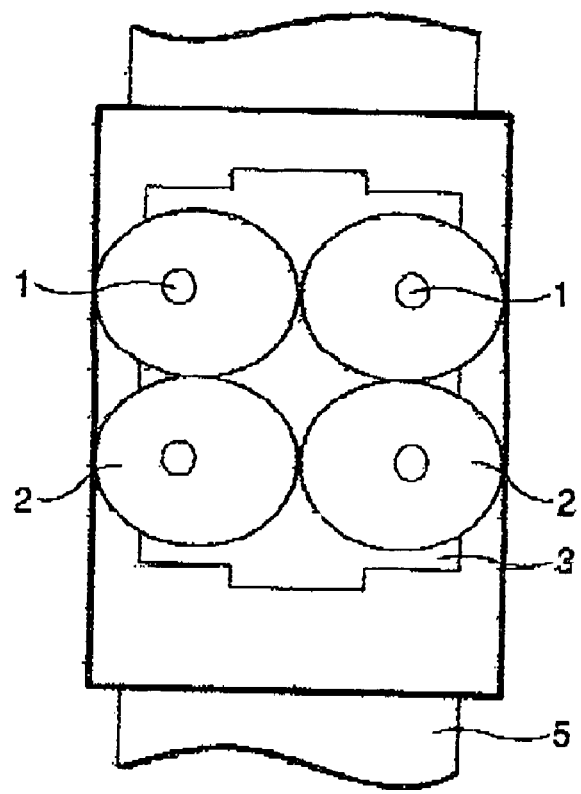
FIGS. 3A and 3B are diagrams showing two views of the configuration of an embodiment of the electromagnetic flowmeter to which the invention is applied.
Figure 3B:
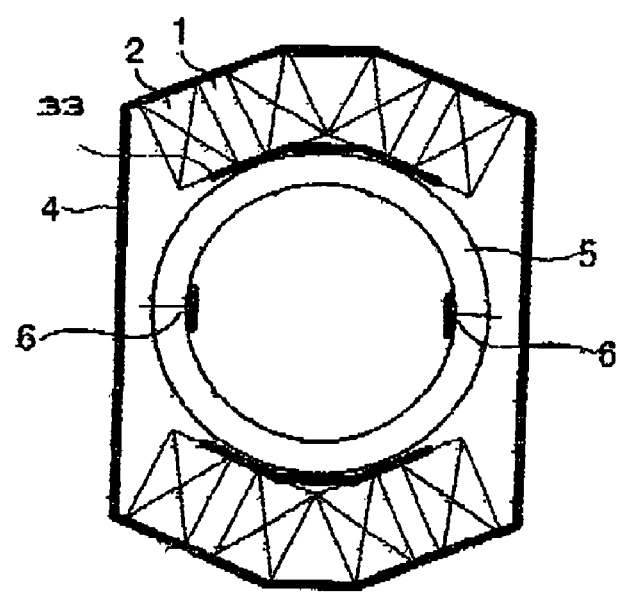

FIGS. 3A and 3B shows an embodiment in which the configuration of the embodiment of FIGS. 1A and 1B is doubled or expanded in the flow path direction of the pipe to be measured 5 in the same manner as FIGS. 2A and 2B. In contrast to the embodiment of FIGS. 1A and 1B in which the two magnetic circuits are used, four magnetic circuits are used in parallel to obtain the magnetic flux density which is two times that of the embodiment of FIGS. 1A and 1B.

Although the shapes of plate cores 33 are different from those in FIGS. 1A, 1B, 2A and 2B, the plate cores perform the same functions of collecting the plural exciting coils, i.e., the plural magnetic circuits on the single plate core to gather magnetic fluxes, and shaping the fluxes so as to evenly intersect with the pipe to be measured 5 in a symmetrical shape.

In the embodiment of FIGS. 3A and 3B, as compared with the embodiment of FIGS. 1A and 1B, the power consumption is doubled in direct proportion to the increased magnetic fluxes. As a result of the two-divided magnetic circuits, however, the increased amount of the power consumption is only one half of that in the case where the magnetic coercive force of each magnetic core is simply doubled and the magnetic cores are not divided.

Next, the functions and effects of the invention will be described with reference to FIGS. 4A to 4E. The figure shows the concept of hysteresis losses in magnetic circuits constituting the most part of the excitation power. A hysteresis loss is given by the product of the residual magnetic flux density Br and the magnetic coercive force Hc in a magnetic core. In FIGS. 4A to 4E, therefore, the area of a square corresponds to a power which is consumed in one period of the magnetization cycle of each magnetic core in which inversion of the magnetic poles is repeated.

Figure 4C:
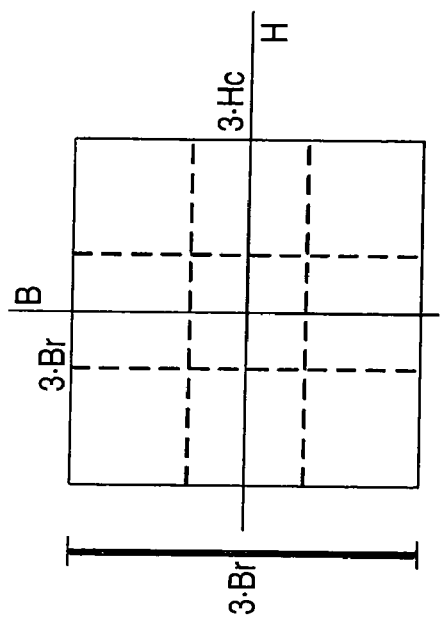
FIGS. 4A to 4E are diagrams illustrating the B-H hysteresis characteristic of a semi-hard magnetic material.
Figure 4E:
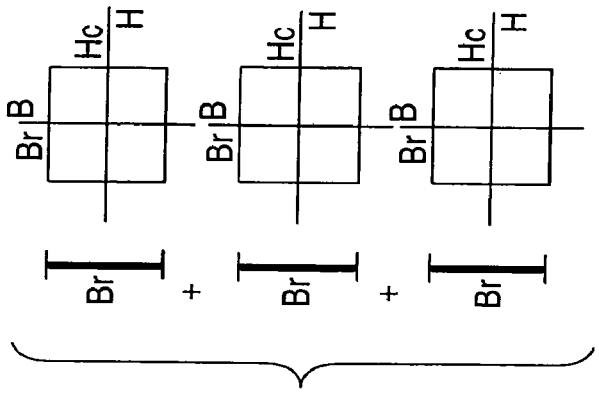
Figure 4B:
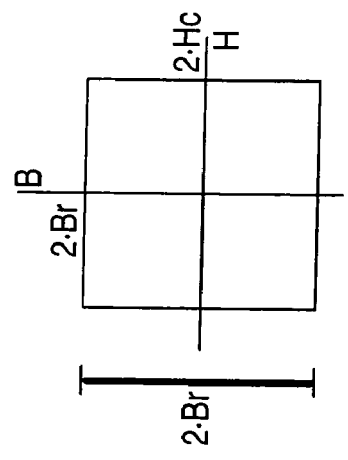
Figure 4D:
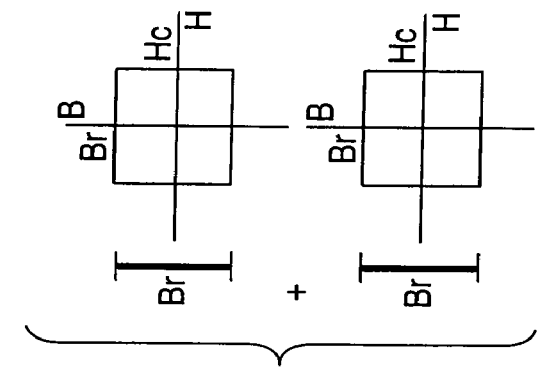
Figure 4A:
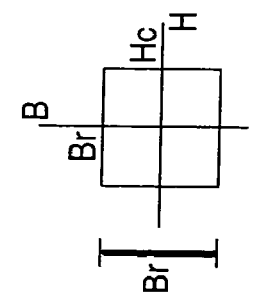

The area of the square in FIG. 4A shows the power consumption in one magnetization cycle of an arbitrary magnetic core due to the magnetic coercive force Hc and the residual magnetic flux density Br. FIG. 4B shows the power consumption required in the case where a magnetic flux density 2·Br which is two times that in FIG. 4A is obtained by using a magnetic core having a magnetic coercive force that is two times that of the magnetic core used in FIG. 4A, or 2·Hc.

FIG. 4C shows the power consumption required in the case where a magnetic flux density 3·Br which is three times that in FIG. 4A is obtained by using a magnetic core having a magnetic coercive force that is three times that of the magnetic core used in FIG. 4A, or 3·Hc.

In the related art examples of FIGS. 4B and 4C, when the magnetic flux density is increased to 2·Br or 3·Br, the required excitation power is exponentially increased, and the power which is four times or nine times that in FIG. 4A is necessary.

When the slope of the permeance in a magnetic circuit is constant, a magnetic core can provide a magnetic energy which is in direct proportional to the magnetic coercive force Hc, as the residual magnetic fluxes Br. In compensation for this, the hysteresis loss is produced in the magnetic circuit, and the loss is increased by the square of Hc. This causes the above-mentioned phenomena.

By contrast, when the invention is applied, magnetic circuits which are driven in order to produce residual magnetic fluxes are configured in parallel, and hence the paralleled magnetic circuits evenly bear the required value of the magnetic coercive force Hc, which causes the hysteresis loss.

In the case where a desired value of Br is to be obtained, when the corresponding value of Hc is divided by N, the above-mentioned hysteresis loss which is increased by the square of Hc can be suppressed as a whole to $N \times (1/N)^2$.

For example, FIG. 4D corresponds to the embodiment of FIGS. 1A and 1B in which the two magnetic circuits are configured in parallel. The magnetic coercive force of 2·Hc, which is born by the single magnetic core in FIG. 4B, is born by two magnetic circuits. Therefore, the magnetic circuits independently produce the magnetic fluxes Br, and 2·Br is attained as a whole by addition of the magnetic fluxes or (Br+Br)

As is apparent from comparison of FIG. 4D with FIG. 4B, both the total amounts of the obtained magnetic flux densities, each of which is indicated by the sum of the lengths of Br on the ordinate B, attain the same value, or 2·Br. By contrast, in FIG. 4B corresponding to the related art example, the power consumption must be increased four times in order to obtain 2·Br.

In FIG. 4E, the magnetic coercive force of 3·Hc, which is born by the single magnetic core in FIG. 4C, is born by three magnetic circuits. The magnetic flux densities Br each of which is independently produced by the corresponding magnetic circuit are gathered to attain (Br+Br+Br) as the total of the magnetic flux densities. These magnetic fluxes are accommodated between the pair of plate cores. As a result, 3·Br is obtained as the total magnetic flux density intersecting with the fluid to be measured.

As is apparent from comparison of FIG. 4E with FIG. 4C, both the desired total amounts of the magnetic flux densities, each of which is indicated by the sum of the lengths of Br on the ordinate B, attain the same length, or magnetic fluxes of 3·Br. By contrast, FIG. 4C showing the related art example indicates that the excitation power of the single magnetic circuit is increased by the rate of nine times.

As described above, according to the embodiments, in the case where a desired magnetic flux density is to be attained, the generation of the magnetic flux density is born by plural parallel magnetic circuits, so that the magnetization energy which is required in each single magnetic circuit can be remarkably reduced.

Namely, in the configuration where a magnetic circuit is divided into an N number of parallel magnetic circuits, and the circuits are accommodated on a single plate core, the power consumption of each of the magnetic circuits can be reduced to 1/N of that in the configuration of a single magnetic circuit. In the case where the electromagnetic flowmeter of the residual magnetic field type is driven by batteries, therefore, a large effect can be achieved by this energy saving. Moreover, the volume of a power supply unit and the battery capacity can be reduced, whereby miniaturization and reduction of a required space can be realized.

What is claimed is:

1. An electromagnetic flowmeter comprising:
   a plurality of magnetic pole cores which produce magnetic fluxes intersecting with a fluid to be measured flowing through a pipe;

an exciting coil which applies an external magnetic field to each of the magnetic pole cores; and a pair of plate cores which are in contact with the pipe, wherein the electromagnetic flowmeter is of a residual magnetic field type.

2. The electromagnetic flowmeter according to claim 1, wherein each of the magnetic pole cores bear a magnetic coercive force corresponding to each of the magnetic fluxes.

3. The electromagnetic flowmeter according to claim 1, wherein each of the magnetic pole cores evenly bear a magnetic coercive force corresponding to each of the magnetic fluxes.

4. The electromagnetic flowmeter according to claim 1, wherein the plurality of magnetic pole cores are disposed on the plate cores so that all magnetic fields are aligned in a same direction.

5. The electromagnetic flowmeter according to claim 1, wherein the plate cores are disposed between the magnetic pole cores and the pipe.

6. The electromagnetic flowmeter according to claim 1, wherein the magnetic fluxes produced by the plurality of magnetic pole cores are gathered to the plate cares, the plate cares shape magnetic fluxes which evenly intersect in an interior of the pipe.

7. The electromagnetic flowmeter according to claim 1, wherein each of the plurality of magnetic pole cores forms an independent magnetic circuit.

8. The electromagnetic flowmeter according to claim 7, wherein the magnetic circuit corresponding to each magnetic pole cores has a same magnetomotive force and a same permeance, and shapes of magnetic paths are congruent with one another.

9. The electromagnetic flowmeter according to claim 1, wherein the magnetic fluxes are produced by a residual magnetic field in which a direction is alternately inverted at a constant period.

10. The electromagnetic flowmeter according to claim 1, wherein a stabilized state of a system is attained on a permeance line.

11. The electromagnetic flowmeter according to claim 1, wherein the electromagnetic flowmeter is driven by a battery.

12. The electromagnetic flowmeter according to claim 1, wherein a semi-hard magnetic material having a magnetic coercive force of approximately 400 A/m to approximately 8 kA/m is and for the magnetic pole core.

13. The electromagnetic flowmeter according to claim 12, wherein two pairs or four of to magnetic pole cores are used, and the magnetic pole cores are arranged so as to be on the same section of the pipe along a circumferential direction of the pipe.

14. The electromagnetic flowmeter according to claim 12, wherein each of the magnetic pole cores is provided with the exciting coil of the same number of turns, the exciting coils of two of the magnetic pole cores that constitute a pair are wound in a direction so as to share the same magnetic field, the exciting coils of another two of the magnetic pole cores that constitute another pair are wound in a direction so as to share the same magnetic field, and the pair of the exciting coils and the another pair of the exiting coils are opposed to each other.

15. The electromagnetic flowmeter according to claim 14, wherein the exciting coils making the pair are closely disposed on an upper face side of the pipe, and the exciting coils making the another pair are closely disposed on a lower face side of the pipe, so that the pair of the exciting coils and the another pair of the exciting coils being opposed to each other are angularly separated at a maximum degree, and the pair of the exciting coils and the another pair of the exciting coils alternately serve as a S-pole or a N-pole.

16. The electromagnetic flowmeter according to claim 14, wherein one of the plate cores is disposed between the pipe and the pair of the exciting coils so as to be in close contact with the exciting coils, another of the plate cores is disposed between the pipe and the another pair of the exciting coils so as to be in close contact with the exciting coils, and each of the plate cores has a shape extending along a circumference of the pipe.

17. The electromagnetic flowmeter according to claim 1, further comprising:

electrodes disposed so as to be in contact with the fluid to be measured, wherein the exciting coils of two of the magnetic pole cores that constitute a pair are closely disposed on an upper face side of the pipe, the exciting coils of another two of the magnetic pole cores that constitute another pair are closely disposed on a lower face side of the pipe, the electrodes are opposed to each other and disposed at two places at an angle of approximately 90 degrees-with respect to an axis connecting centers of the pair of the exciting coils and the another pair of the exciting coils.

18. The electromagnetic flowmeter according to claim 17, wherein the electrodes are disposed at positions perpendicularly intersecting with a direction of the magnetic field produced by the pair of the exciting coils and the another pair of the exciting coils.

19. The electromagnetic flowmeter according to claim 1, wherein the plate cores and the exciting coils of the magnetic pole cores of both poles are placed so as to be axisymmetric about a central axis so that shapes of magnetic circuits produced by two of the exciting coils are axisymmetric and congruent.

* * * * *